US011475641B2

(12) United States Patent
Price et al.

(10) Patent No.: US 11,475,641 B2
(45) Date of Patent: Oct. 18, 2022

(54) COMPUTER VISION CAMERAS FOR IR LIGHT DETECTION

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 16/934,572

(22) Filed: Jul. 21, 2020

(65) Prior Publication Data

US 2022/0028169 A1 Jan. 27, 2022

(51) Int. Cl.
| | | |
|---|---|---|
| *G06T 19/00* | (2011.01) | |
| *G02B 27/01* | (2006.01) | |
| *H04N 5/33* | (2006.01) | |
| *H04N 13/344* | (2018.01) | |
| *H04N 13/00* | (2018.01) | |
| *G06F 3/01* | (2006.01) | |

(52) U.S. Cl.
CPC ........ *G06T 19/006* (2013.01); *G02B 27/0172* (2013.01); *H04N 5/33* (2013.01); *H04N 13/344* (2018.05); *G02B 2027/0129* (2013.01); *H04N 2013/0081* (2013.01)

(58) Field of Classification Search
CPC .............. G06T 19/006; G02B 27/0172; G02B 2027/0129; H04N 5/33; H04N 13/344; H04N 2013/0081
See application file for complete search history.

(56) References Cited

U.S. PATENT DOCUMENTS

| | | | |
|---|---|---|---|
| 4,695,878 A | 9/1987 | Levine et al. | |
| 2015/0002629 A1* | 1/2015 | Wei ..................... | H04N 9/04559 348/46 |
| 2015/0022439 A1* | 1/2015 | Alameh ................ | G06F 3/017 345/156 |
| 2015/0223683 A1* | 8/2015 | Davidovics ........ | G02B 27/0093 351/210 |
| 2015/0381972 A1* | 12/2015 | Kowdle ................. | G06T 7/521 348/51 |

(Continued)

OTHER PUBLICATIONS

Data Sheet of Broadcom APDS-9253-001 Digital RGB Sensor (Mar. 12, 2019) (Year: 2019).*

(Continued)

*Primary Examiner* — Sing-Wai Wu

(74) *Attorney, Agent, or Firm* — Workman Nydegger

(57) ABSTRACT

A head-mounted device (HMD) is structured to include at least one computer vision camera that omits an IR light filter. Consequently, this computer vision's sensor is able to detect IR light, including IR laser light, in the environment. The HMD is configured to generate an image of the environment using the computer vision camera. This image is then fed as input into a machine learning (ML) algorithm that identifies IR laser light, which is detected by the sensor and which is recorded in the image. The HMD then visually displays a notification comprising information corresponding to the detected IR laser light.

20 Claims, 15 Drawing Sheets

(56) References Cited

U.S. PATENT DOCUMENTS

| | | | |
|---|---|---|---|
| 2016/0184698 A1* | 6/2016 | Tan | A63F 13/219 463/2 |
| 2016/0195856 A1* | 7/2016 | Spero | H05B 47/155 700/90 |
| 2016/0260261 A1 | 9/2016 | Hsu et al. | |
| 2019/0297312 A1 | 9/2019 | Price et al. | |

OTHER PUBLICATIONS

Youtube Video: Thermal Camera with Glass (Attoparsec) Sep. 20, 2013. https://www.youtube.com/watch?v=EZyN48nFiRY (Year: 2013).*

"International Search Report and Written Opinion Issued in PCT Application No. PCT/US2021/027878", dated Jul. 26, 2021, 30 Pages. (MS# 408736-WO-PCT).

\* cited by examiner

COMPUTER VISION CAMERAS FOR IR LIGHT DETECTION

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

MR devices benefit from sensors that can improve or augment a user's understanding of the world around him/her. By way of example, there are many cases where users have a desire to see in the dark. For instance, first responders benefit from using low light cameras to aid in search and rescue activities. Additionally, fire departments have AR goggles with thermal imaging systems that enable the perception of temperature. Unfortunately, the sensors used for low light and thermal sensing are expensive and bulky. The cost for each of these sensors is in the $1,000-$3,000 range, representing up to 40% of the cost of the materials used in the HMD. Each sensor is also about 1"×1"×1.5" in size and weighs approximately 30-35 grams. These sensors are also high power, dissipating up to 1-1.5 W per sensor.

Despite the cost and size of low light sensors, their utility is quite limited because the high dark current and read noise limits the ability to see in environments below about starlight lighting levels. One of the key functionalities of these low light sensors, however, is the ability to see through glass and to detect lasers (e.g., infrared (IR) lasers, such as those used for target designation in MR games). What is needed, therefore, is an improved technique for detecting IR laser light with minimal cost to the overall system, and without adding size, weight, or power to the system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods for detecting infrared (IR) laser light that is being emitted in an environment.

In some embodiments, a head-mounted device (HMD) is structured to include at least one computer vision camera that omits an IR light filter. Consequently, this computer vision's sensor is able to detect IR light, including IR laser light, in the environment. The HMD is configured to generate an image of the environment using the computer vision camera. This image is then fed as input into a machine learning (ML) algorithm that identifies IR laser light, which is detected by the sensor and which is recorded in the image. The HMD then visually displays a notification comprising information corresponding to the detected IR laser light.

In some embodiments, the HMD, which is configured in the manner described above, generates a first image of the environment using the computer vision camera. The HMD also generates a second image of the environment using a thermal imaging camera. The first image is then fed as input to a machine learning (ML) algorithm, which is configured to identify collimated IR light that is detected by the sensor of the computer vision camera and that is recorded in the first image. The HMD reprojects the second image to compensate for parallax between a pupil of a user wearing the HMD and the thermal imaging camera. Additionally, the HMD reprojects the identified collimated IR light to compensate for parallax between the user's pupil and the computer vision camera. The HMD also overlays the reprojected collimated IR light onto the reprojected second image to generate an overlaid image and then visually displays the overlaid image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein relate to systems, devices (e.g., hardware storage devices, wearable devices, etc.), and methods for detecting infrared (IR) laser light that is being emitted in an environment.

In some embodiments, an HMD includes a computer vision camera that omits an IR light filter. The HMD generates an image of the environment using the computer vision camera. This image is fed as input into a ML algorithm to identify the IR laser light. The HMD then visually displays a notification describing the detected IR laser light.

In some embodiments, the HMD generates a first image using the computer vision camera and a second image using a thermal imaging camera. The first image is fed as input to a ML algorithm to identify collimated IR light. The HMD reprojects the second image to compensate for parallax and reprojects the identified collimated IR light to also compensate for parallax. The HMD overlays the reprojected collimated IR light onto the reprojected second image to generate an overlaid image and then visually displays the overlaid image.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial improvements, benefits, and practical applications to the technical field. By way of example, the disclosed embodiments improve how conditions in an environment (e.g., the presence of IR laser light) are detected. The embodiments also beneficially provide notifications regarding the detection of these environmental conditions. Furthermore, the disclosed embodiments operate to reduce the cost of an HMD, the power usage of an HMD, and even the weight of the HMD.

That is, the embodiments solve the problem of detecting IR laser light in an environment. By repurposing an existing camera system (e.g., the head tracking HeT cameras, which are a specific form of a computer vision camera used to track movements of the HMD) to detect IR light, the embodiments are able to prevent the requirement of adding a low light camera, which traditionally detects IR light. Additionally, by preventing the requirement of adding the low light camera, the embodiments reduce hardware costs, reduce the size and weight of the HMD, and reduce power expenditure of the system (e.g., because fewer hardware components are used, less power will be consumed). Accordingly, by performing the disclosed operations, the embodiments are able to significantly improve HMD operations.

Example Scenarios, Including Gaming Implementations, and HMD Configurations

Figure 1:
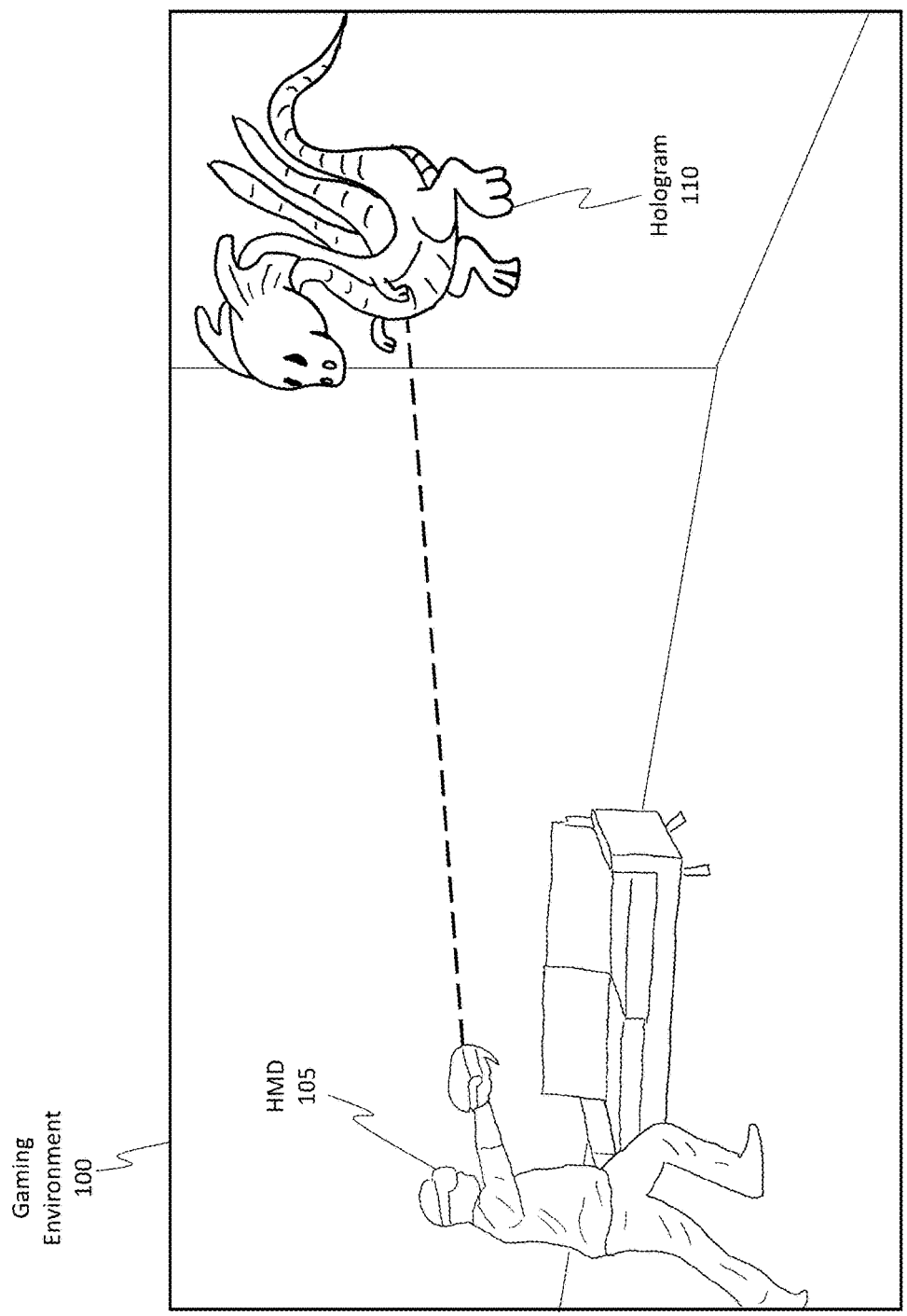
FIG. 1 illustrates an example scenario involving a gaming application.

FIG. 1 shows an example gaming environment 100 in which an HMD 105 is operating. In this scenario, the HMD 105 is presenting a MR scene to the user, where the scene includes a hologram 110 in the form of a dragon. Additionally, in this scene, the person wearing the HMD 105 is fighting or battling the dragon. It is often the case that HMDs, including HMD 105, are used in low light environments. It is also often the case that HMDs are used in scenarios in which visible light and/or IR laser light is being emitted into the environment to help with target detection. For instance, it may be the case that in the gaming environment 100, the user of HMD 105 is using an IR laser emitter to target his/her weapon in order to fire on the hologram 110. As such, it is highly beneficial to provide a system with improved IR laser light detection. The disclosed embodiments provide this sought-after benefit.

Figure 2:
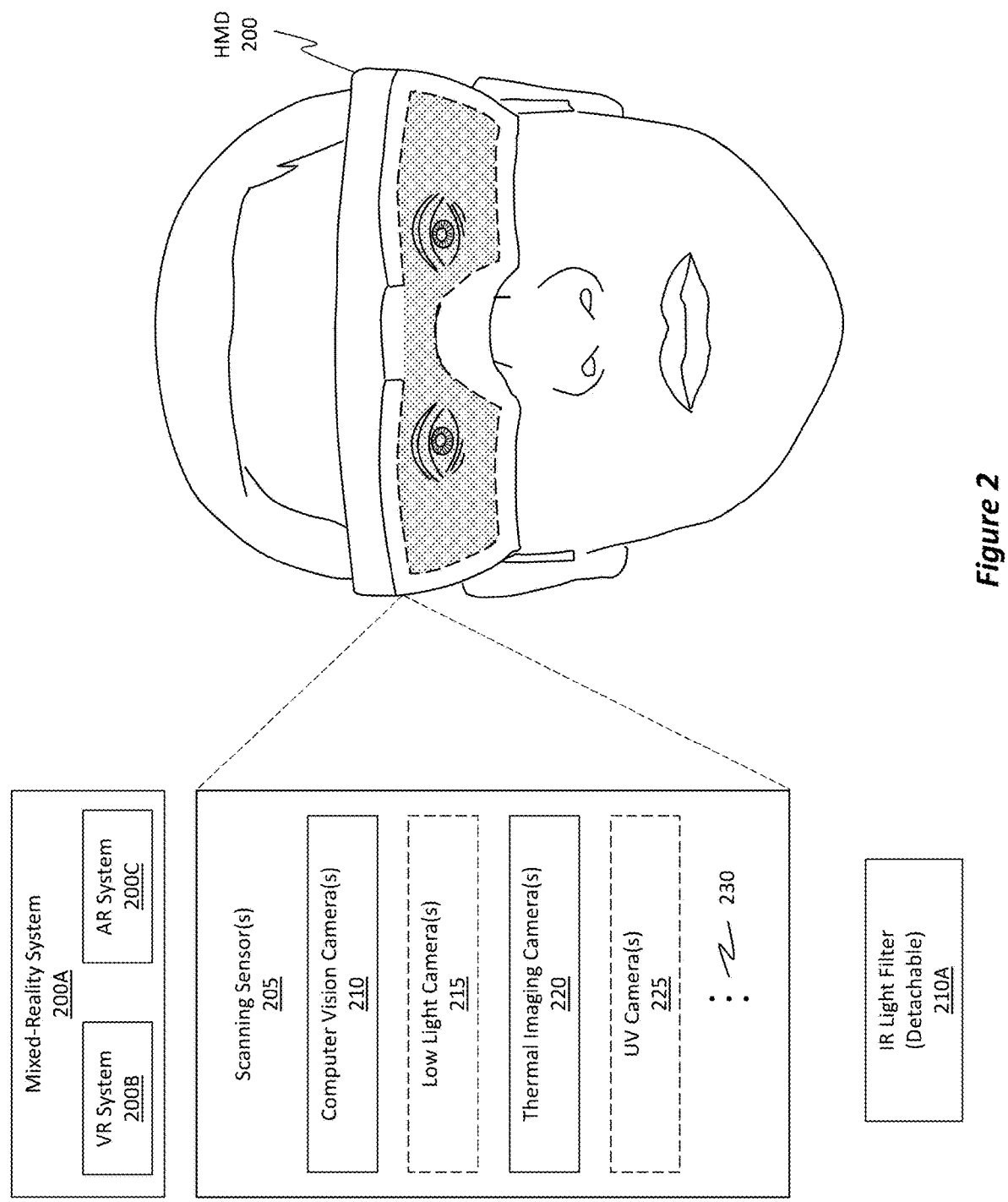
FIG. 2 illustrates an example head-mounted device (HMD).
Figure 3:
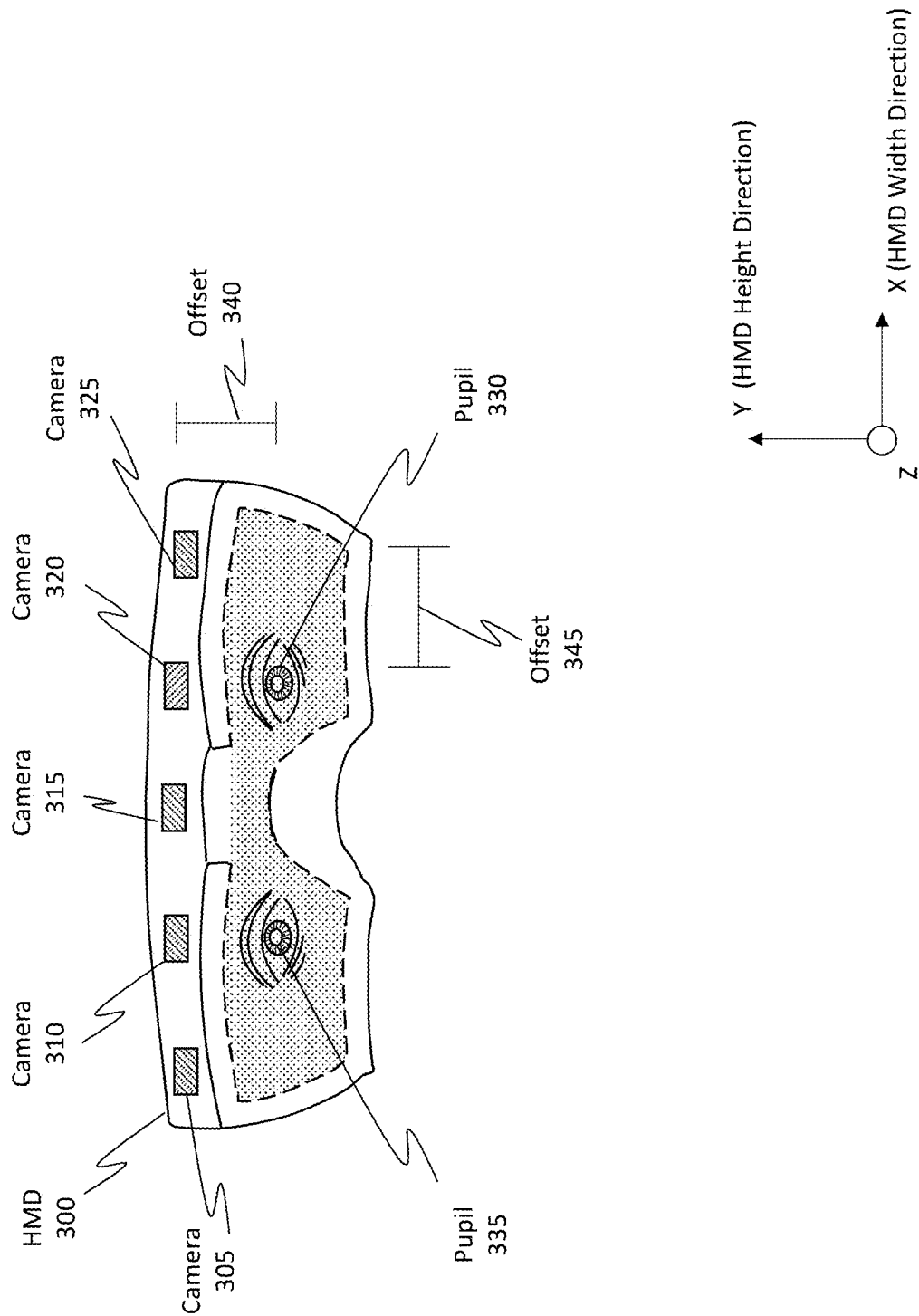
FIG. 3 illustrates an example implementation or configuration of an HMD.

HMD 105 may be configured in various different ways, as illustrated in FIGS. 2 and 3. By way of example, HMD 105 of FIG. 1 may be configured as the HMD 200 of FIG. 2. HMD 200 can be any type of MR system 200A, including a VR system 200B or an AR system 200C. It should be noted that while a substantial portion of this disclosure is focused on the use of an HMD, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 200 is shown as including scanning sensor(s) 205 (i.e. a type of scanning or camera system), and HMD 200 can use the scanning sensor(s) 205 to scan environments, map environments, capture environmental data, and/or generate any kind of images of the environment (e.g., by generating a 3D representation of the environment or by generating a "passthrough" visualization). Scanning sensor(s) 205 may comprise any number or any type of scanning devices, without limit.

In accordance with the disclosed embodiments, the HMD 200 may be used to generate a parallax-corrected passthrough visualization of the user's environment. In some cases, a "passthrough" visualization refers to a visualization that reflects what the user would see if the user were not wearing the HMD 200, regardless of whether the HMD 200 is included as a part of an AR system or a VR system. In other cases, the passthrough visualization reflects a different or novel perspective. In some cases, the passthrough visualization identifies conditions that may not be detectable by a human eye, such as the presence of IR laser light in the environment.

To generate this passthrough visualization, the HMD 200 may use its scanning sensor(s) 205 to scan, map, or otherwise record its surrounding environment, including any objects or IR light in the environment, and to pass that data on to the user to view. In many cases, the passed-through data is modified to reflect or to correspond to a perspective of the user's pupils, though other perspectives may be reflected by the image as well. The perspective may be determined by any type of eye tracking technique or other data.

To convert a raw image into a passthrough image, the scanning sensor(s) 205 typically rely on its cameras (e.g., any type of computer vision camera, such as a head tracking camera, a hand tracking camera, a depth camera, or any other type of camera) to obtain one or more raw images (aka texture images) of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections. In some cases, the depth map can be assessed by 3D sensing systems, including time of flight, stereo, active stereo, or structured light systems. Furthermore, an assessment of the visual map of the surrounding environment may be performed with head tracking cameras, and these head tracking cameras typically have a stereo overlap region to assess 3D geometry and generate a map of the environment.

As used herein, a "depth map" details the positional relationship and depths relative to objects in the environment. Consequently, the positional arrangement, location, geometries, contours, and depths of objects relative to one another can be determined. From the depth maps, a 3D representation of the environment can be generated. As will be described in more detail later, a depth map may be used to perform parallax correction on a passthrough image.

From the passthrough visualizations, a user will be able to perceive what is currently in his/her environment without having to remove or reposition the HMD 200. Furthermore, as will be described in more detail later, the disclosed passthrough visualizations will also enhance the user's ability to view objects or conditions (e.g., the presence or absence of IR laser light) within his/her environment (e.g., by displaying additional environmental conditions or image data that may not have been detectable by a human eye).

It should be noted that while the majority of this disclosure focuses on generating "a" passthrough (or overlaid) image, the embodiments may generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 205 include computer vision camera(s) 210 (with a detachable IR light filter 210A), low light camera(s) 215 (though not necessarily, as represented by the dotted box in FIG. 2), thermal imaging camera(s) 220, potentially (though not necessarily, as represented by the dotted box) ultraviolet (UV) camera(s) 225, and potentially (though not necessarily) a dot illuminator (not shown). The ellipsis 230 demonstrates how any other type of camera or camera system (e.g., depth cameras, time of flight cameras, virtual cameras, depth lasers, etc.) may be included among the scanning sensor(s) 205.

As an example, a camera structured to detect mid-infrared wavelengths may be included within the scanning sensor(s) 205. As another example, any number of virtual cameras that are reprojected from an actual camera may be included among the scanning sensor(s) 205 and may be used to generate a stereo pair of images. In this manner and as will be discussed in more detail later, the scanning sensor(s) 205 may be used to generate the stereo pair of images. In some cases, the stereo pair of images may be obtained or generated as a result of performing any one or more of the following operations: active stereo image generation via use of two cameras and one dot illuminator; passive stereo image generation via use of two cameras; image generation using structured light via use of one actual camera, one virtual camera, and one dot illuminator; or image generation using a time of flight (TOF) sensor in which a baseline is present between a depth laser and a corresponding camera and in which a field of view (FOV) of the corresponding camera is offset relative to a field of illumination of the depth laser.

Generally, a human eye is able to perceive light within the so-called "visible spectrum," which includes light (or rather, electromagnetic radiation) having wavelengths ranging from about 380 nanometers (nm) up to about 740 nm. As used herein, the computer vision camera(s) 210 include two or more monochrome cameras structured to capture light photons within the visible spectrum. Often, these monochrome cameras are complementary metal-oxide-semiconductor (CMOS) type cameras, though other camera types may be used as well (e.g., charge coupled devices, CCD). These monochrome cameras can also extend into the NIR regime (up to 1100 nm).

The monochrome cameras are typically stereoscopic cameras, meaning that the fields of view of the two or more monochrome cameras at least partially overlap with one another. With this overlapping region, images generated by the computer vision camera(s) 210 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the computer vision camera(s) 210 can be used to not only generate passthrough visualizations, but they can also be used to determine object depth. In some embodiments, the computer vision camera(s) 210 can capture both visible light and IR light.

In accordance with the disclosed embodiments, the computer vision camera(s) 210 (in some cases also referred to as head tracking cameras) are configured to omit an IR light filter. In some cases, the IR light filter is detachable (e.g., as shown by detachable IR light filter 210A) such that it may be attached or detached from the HMD, or rather it is detachable from the computer vision camera. By removing or detaching the IR light filter from the computer vision camera(s) 210, the computer vision camera(s) 210 will be able to detect at least some IR light. For instance, IR lasers typically emit IR laser light having wavelengths between about 850 nanometers and 1064 nanometers. By removing the IR light filter from the computer vision camera(s) 210, these cameras are able to detect at least some wavelengths of IR light, including the wavelengths for IR laser light.

Optionally, the HMD 200 may include low light camera(s) 215. In some cases, the HMD 200 may not include the low light camera(s) 215. When the HMD 200 does include the low light camera(s) 215, these cameras can be selectively operated such that they may have a default off state.

If the HMD 200 does include the low light camera(s) 215, these cameras are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,100 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the computer vision camera(s) 210 and the low light camera(s) 215 (aka low light night vision cameras) operate in approximately the same overlapping wavelength range. In some cases, this overlapping wavelength range is between about 400 nanometers and about 1,100 nanometers. Additionally, in some embodiments these two types of cameras are both silicon detectors. By removing the IR light filter from the computer vision camera(s) 210, the HMD 200 can refrain from relying on the low light camera(s) 215 to detect at least IR "laser" light. Consequently, in preferred embodiments, the HMD 200 omits or does not include the low light camera(s) 215.

The thermal imaging camera(s) 220 are structured to detect electromagnetic radiation or IR light in the far-IR (i.e. thermal-IR) range, though some embodiments also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns to detect blackbody radiation from the environment and people in the camera field of view. Because the thermal imaging camera(s) 220 detect far-IR radiation, the thermal imaging camera(s) 220 can operate in any illuminance condition, without restriction.

The UV camera(s) 225 are structured to capture light in the UV range. The UV range includes electromagnetic radiation having wavelengths between about 150 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" or "computer vision cameras" (including "head tracking cameras"), are cameras that are primarily used for computer vision to perform head tracking. These cameras can detect visible light, or even a combination of visible and IR light (e.g., a range of IR light, including IR light having wavelengths at least between about 850 nm and 1064 nm because of the removal of the IR light filter). In some cases, these cameras are global shutter devices with pixels being about 3 μm in size. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types.

It should be noted that any number of cameras may be provided on the HMD 200 for each of the different camera types. That is, the computer vision camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215 (if present), the thermal imaging camera(s) 220, and the UV camera(s) 225 may each respectively include 1, 2, 3, 4, 5, 6, 7, 8, 9, 10, or more than 10 corresponding cameras.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the computer vision camera(s) 210, the low light camera(s) 215 (if present), the thermal imaging camera(s) 220, and the UV camera(s) 225 from FIG. 2. While only 5 cameras are illustrated in FIG. 3, HMD 300 may include more or less than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) for the user of HMD 300 to view. In doing so, HMD 300 is able to provide a visualization of the real world without requiring the user to remove or reposition HMD 300. These passthrough image(s) effectively represent the same view the user would see if the user were not wearing HMD 300. In some cases, the passthrough images provide enhanced imagery (e.g., representations of IR laser light) that may not be detectable with a human eye. Cameras 305-325 are used to provide these passthrough image(s).

None of the cameras 305-325, however, are telecentrically aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images (aka texture images) produced by the cameras 305-325 may not be available for immediate use as passthrough images. Instead, it is beneficial to perform a parallax correction (aka an image synthesis) on the raw images to transform the perspectives embodied within those raw images to correspond to perspectives of the user's pupils 330 and 335. The parallax correction includes any number of corrections, which will be discussed in more detail later.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
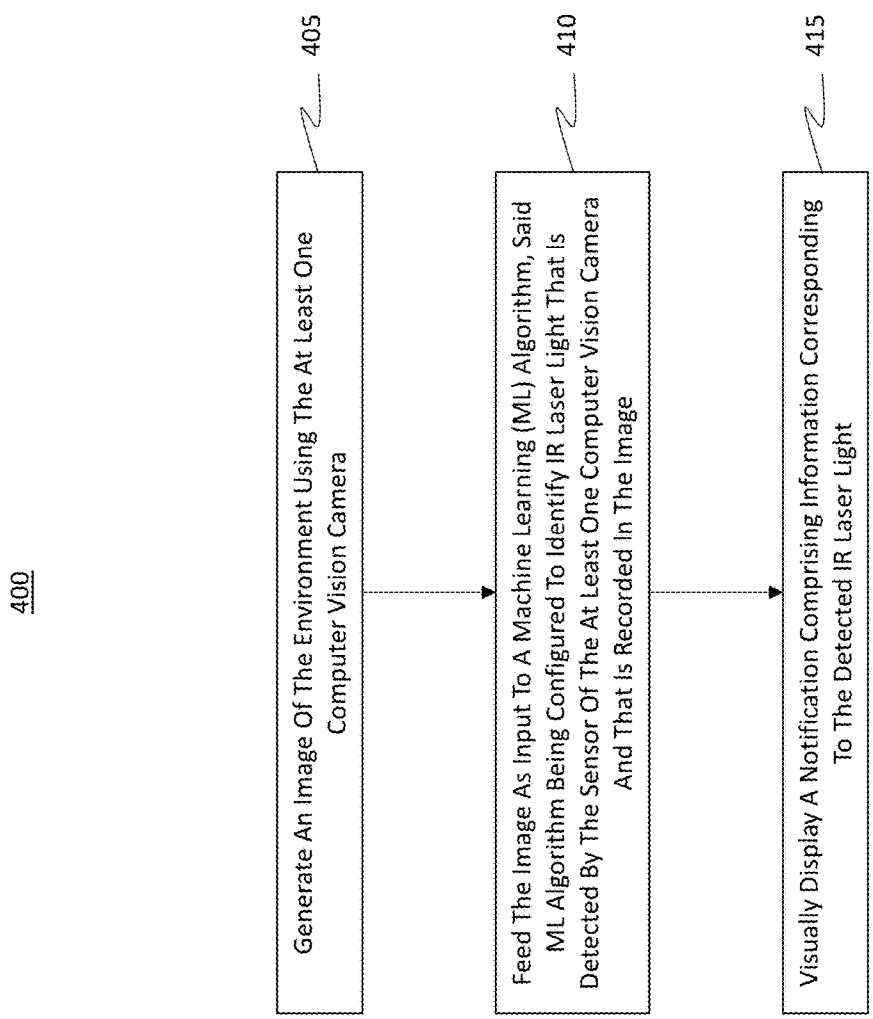
FIG. 4 illustrates a flowchart of an example method for detecting IR laser light in an environment.

Attention will now be directed to FIG. 4, which illustrates a flowchart of an example method 400 for detecting IR laser light being emitted in an environment. Method 400 may be performed by the HMDs discussed thus far. For instance, the HMD may include at least one computer vision camera that omits an IR light filter such that a sensor of the at least one computer vision camera is operable to detect IR light, including IR "laser" light, in the environment.

Typically, method 400 is performed in a low light environment. For instance, method 400 may be triggered when the ambient light conditions of the environment are at or below about 5 lux. By way of reference, the illuminance corresponding to a dusk illuminance is about 10 lux while the illuminance corresponding to a bright noonday sun illuminance is about 100,000 lux.

Figure 5:
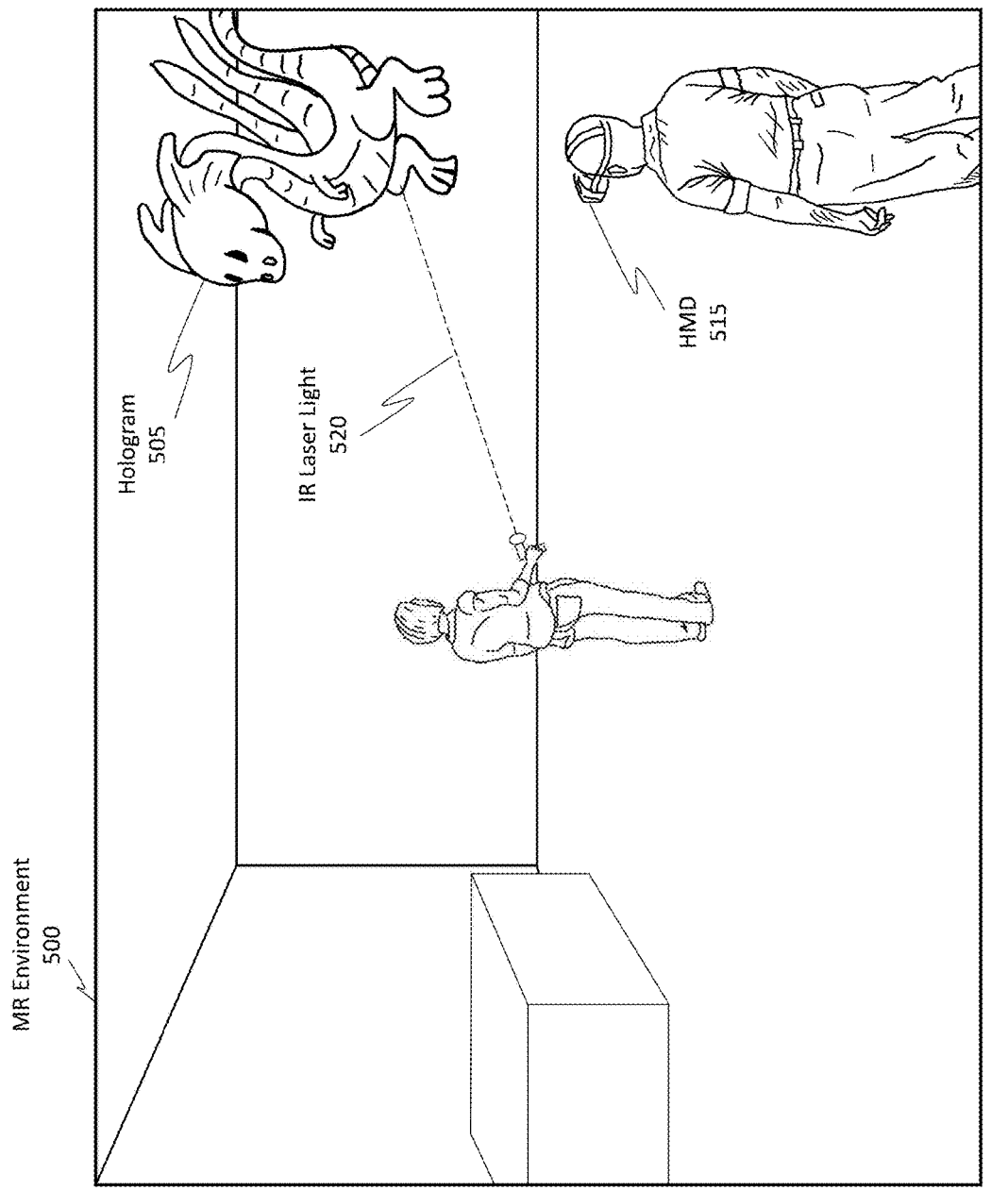
FIG. 5 illustrates an example scenario in which IR laser light is being emitted in the environment.
Figure 6:
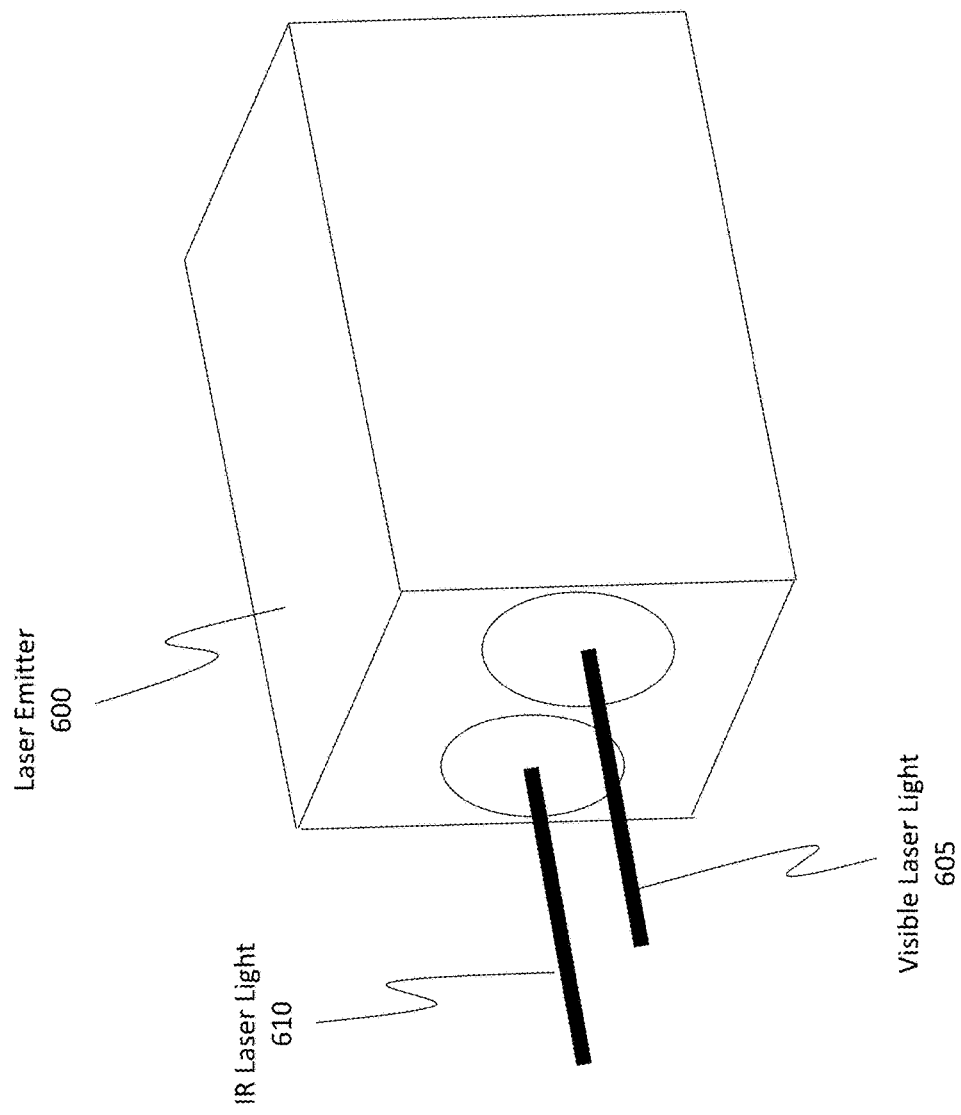
FIG. 6 illustrates an example of an IR laser emitter.
Figure 7:
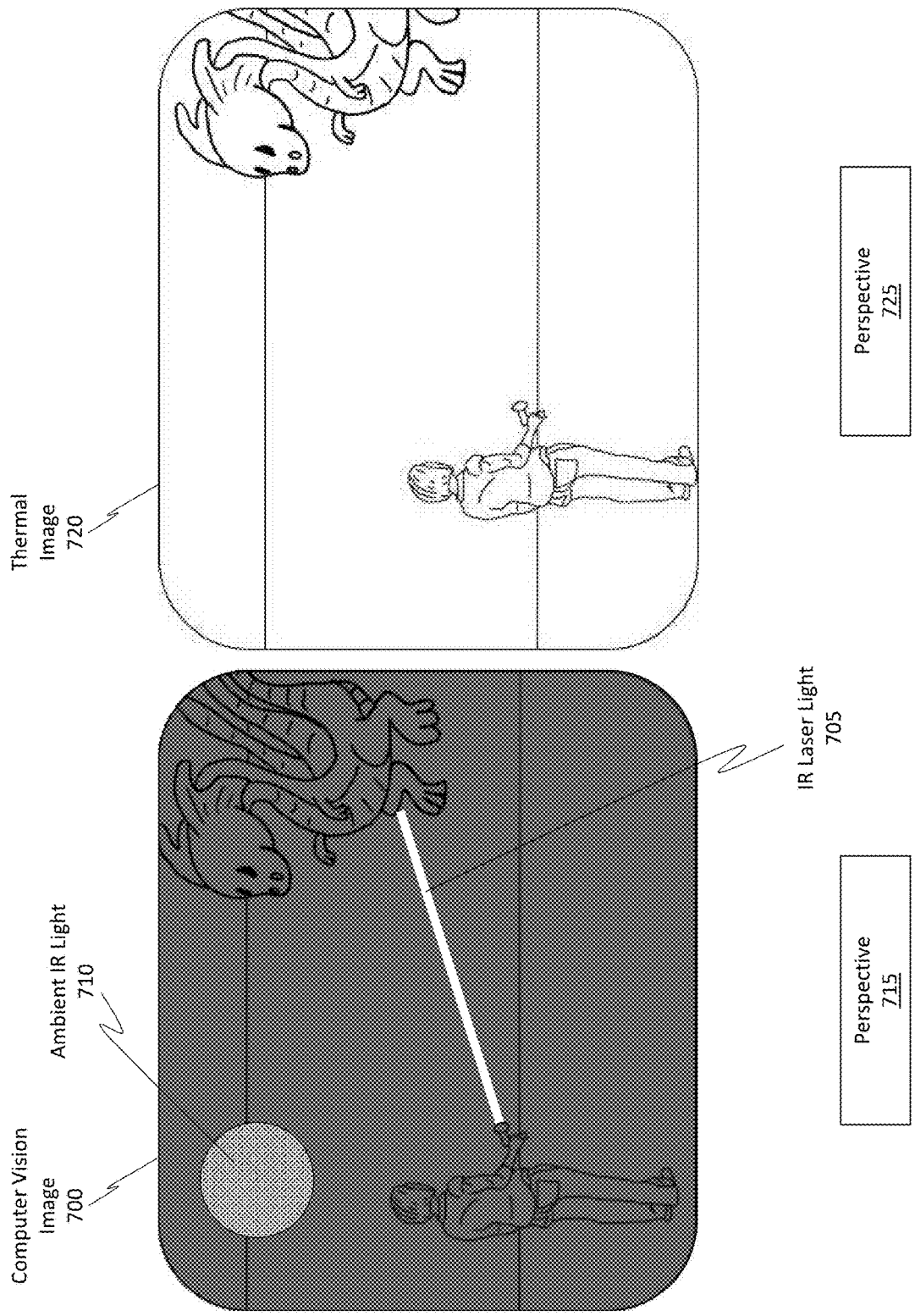
FIG. 7 illustrates an example computer vision image and a thermal image.

Initially, method 400 includes an act (act 405) of generating an image of the environment using at least one computer vision camera. FIGS. 5 through 7 are illustrative.

FIG. 5 shows a MR environment 500 that includes real-world objects and a hologram 505. Here, the ambient light level 510 is at or below the 5 lux level. Consequently, the method 400 from FIG. 4 may be triggered. Different sensors may be used to detect the illuminance of the MR environment 500 in order to trigger the method 400.

Notice, in MR environment 500, a HMD 515 is present, which HMD 515 is configured in the manner described in the earlier figures. Additionally, the MR environment 500 is shown as including IR laser light 520. The IR laser light 520 is represented using a dotted line to symbolize how the IR laser light 520 is not detectable via the naked eye. In this MR environment 500, multiple persons are playing a game and battling the dragon, which is the hologram 505. Of course, other types of MR environments may be used and not just gaming scenarios. For instance, any type of training environment (e.g., first responder) or any other type of environment may be used.

The disclosed embodiments are able to detect the presence of IR laser light using a multi-purposed or re-purposed computer vision camera that omits an IR light filter. FIG. 6 illustrates an example laser emitter 600 that may be structured to emit visible laser light 605 (e.g., perhaps red laser light or green laser light) and/or IR laser light 610. In some implementations, the laser emitter 600 is structured to emit only the IR laser light 610. In any event, the laser emitter 600 may be used in the MR environment 500 of FIG. 5 to help facilitate target detection, especially in low light gaming scenarios or other training scenarios. The IR laser light 610 has the wavelengths discussed earlier (e.g., at least between about 850 nm and 1064 nm) such that the HMD's computer vision cameras are able to detect the IR laser light 610.

FIG. 7 shows a resulting computer vision image 700, which is generated by the HMD's computer vision cameras. Notice, the computer vision image 700 includes pixels representative of the IR laser light 705, which corresponds to the IR laser light 520 of FIG. 5. Whereas the IR laser light 520 was not visible to the naked eye, the IR laser light 705 is identifiable in the computer vision image 700. In some cases, the computer vision image 700 may capture additional IR light, such as is shown by the ambient IR light 710. This ambient IR light 710 may be emitted from other sources in the environment whereas the IR laser light 705 is emitted by the laser emitter 600 of FIG. 6. Notice, there is a stark contrast in the intensity of the IR light forming the IR laser light 705 and the IR light forming the ambient IR light 710. Furthermore, the computer vision image 700 appears to be dark because it was taken in a low light environment.

Typically, the intensity of the IR light forming the IR laser light 705 will be substantially higher than the intensity of the IR light forming the ambient IR light 710. Stated differently, the IR light forming the IR laser light 705 is relatively higher than the intensity of the IR light forming the ambient IR light 710. FIG. 7 also shows how a thermal image 720 may be generated by one of the HMD's thermal imaging cameras.

In some cases, the process of generating the image of the environment (e.g., either one of the computer vision image 700 or the thermal image 720) is triggered based on the detection of a particular environmental condition. For instance, generating the image may be triggered in response to a determination that an ambient light level of the environment (e.g., ambient light level 510 of FIG. 5) is at or below a threshold lux value. In some cases, the threshold lux value is about 5 lux. That is, when the ambient light levels are at or below about 5 lux, the embodiments may be triggered to generate the images discussed above.

As reflected by FIG. 7, the computer vision image 700 is shown as having a particular perspective 715 of the environment 500 from FIG. 5. This perspective 715 corresponds to the optical axis of the computer vision camera used to generate the computer vision image 700.

Some embodiments are additionally configured to generate a thermal image 720 using a thermal imaging camera (e.g., perhaps one or more of the thermal imaging camera(s) 220 of FIG. 2). The thermal imaging camera may generate the thermal image 720 before, after, or at the same time as when the computer vision camera generates the computer vision image 700. Typically, the thermal image 720 and the computer vision image 700 are generated at the same time or are at least generated during an overlapping time period. FIG. 7 also shows how the thermal image 720 has a perspective 725, which corresponds to the optical axis of the thermal imaging camera used to generate the thermal image 720. Because the thermal imaging camera is positioned on the HMD at a different location than the position of the computer vision camera, the perspective 725 will be different from the perspective 715.

Returning to FIG. 4, method 400 also includes an act (act 410) of feeding the image (e.g., the computer vision image) as input to a machine learning (ML) algorithm. The ML algorithm is configured to identify IR laser light that is detected by the sensor of the computer vision camera and that is recorded in the image.

Any type of ML algorithm, model, or machine learning may be used in method act 410. Indeed, as used herein, reference to "machine learning" or to a ML model may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Figure 8:
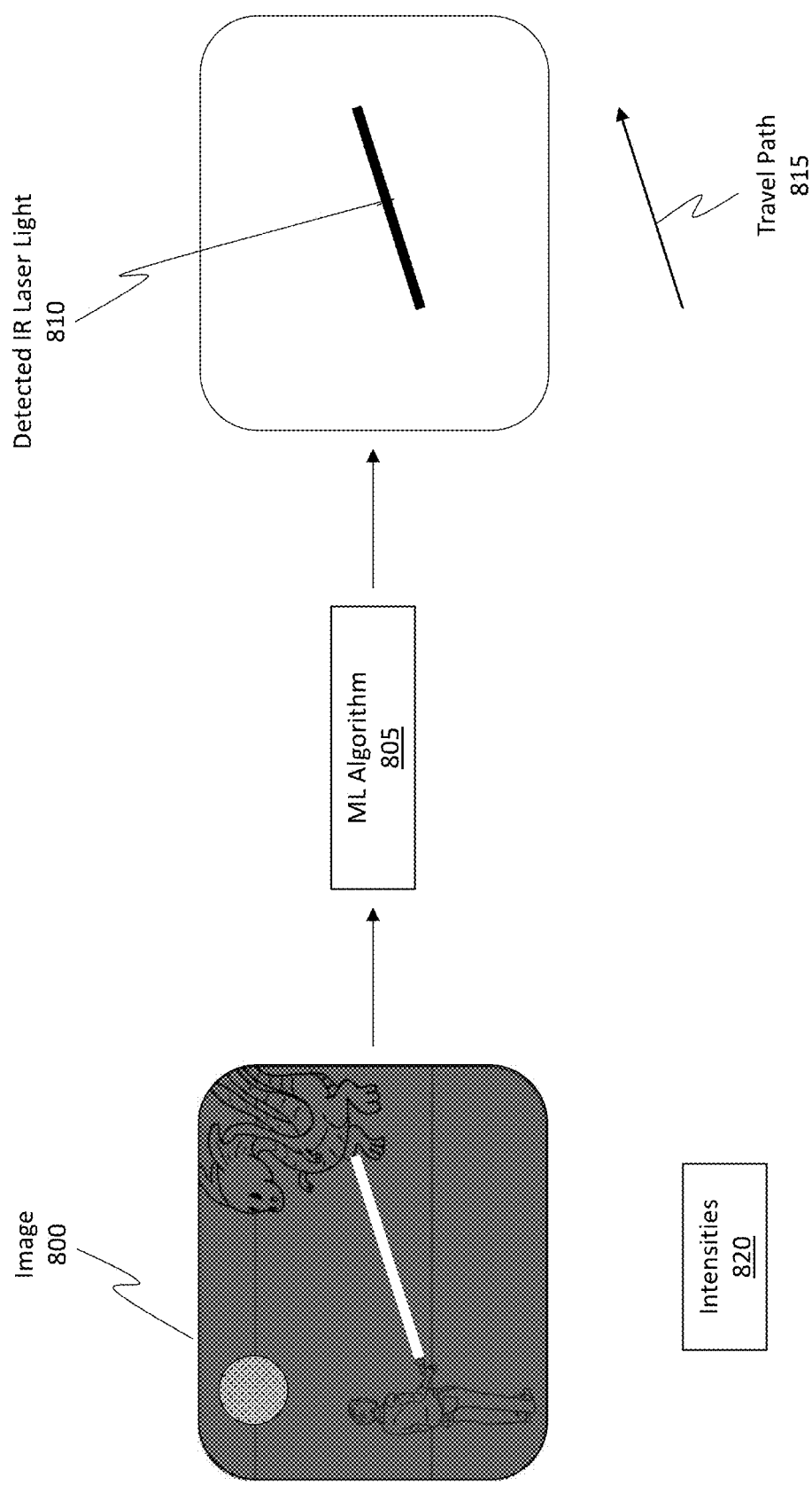
FIG. 8 illustrates how a machine learning (ML) algorithm is able to analyze the computer vision image to parse or identify the IR laser light from other forms of IR light.

FIG. 8 is illustrative of method act 410. Specifically, FIG. 8 shows an image 800, which is representative of the image from act 405 and which is representative of the computer vision image 700 of FIG. 7, being fed as input into a ML algorithm 805. The ML algorithm 805 is configured to identify pixels corresponding to any type of IR light that may be present in the scene, as captured by the image 800. Once the pixels corresponding to the IR light are identified, the ML algorithm 805 further classifies or determines whether each pixel further corresponds to a specific phenomenon or object in the scene. For instance, the ML algorithm 805 is able to identify whether IR light pixels correspond to ambient IR light and is further able to identify whether IR light pixels correspond to IR "laser" light. By way of example, FIG. 8 shows how the ML algorithm 805 analyzes the IR light pixels included in the image 800 and specifically identifies which pixels correspond to IR laser light. Pixels that do not relate to IR laser light can be filtered from the resulting image, leaving only pixels corresponding to the IR laser light, as shown by the detected IR laser light 810.

Notice, the detected IR laser light 810 comprises a line of pixels representative of the laser light discussed earlier. In some cases, the embodiments (e.g., in response to the ML algorithm identifying the IR laser light in the image) trace the IR laser light detected in the image to identify a travel path 815 of the IR laser light through the environment. In this case, the travel path 815 originates at the laser held by the person in the environment and extends outwardly in a direction toward the dragon hologram. Of course, the embodiments are able to trace any travel path followed by the IR laser light.

In some cases, the embodiments identify the IR "laser" light (in contrast to other forms of IR light) by comparing intensities 820 of IR light detected in the image. Typically, the intensity of the IR laser light will be relatively (or even substantially) higher than the intensity of ambient IR light. By initially identifying pixels corresponding to all or most of the IR light in the environment, the embodiments can then compare and contrast the intensities of the detected IR light to determine whether it matches or corresponds to an intensity profile of known IR "laser" light profiles.

In some cases, the embodiments identify and distinguish the IR laser light from other forms of IR light based on the intelligent identification that the IR laser light forms a line or beam of IR light, whereas other forms of IR light likely are not compressed or formed into a beam. The ML algorithm 805 is able to analyze the various different pixels and identify when the IR light pixels are shaped in the form of a beam or line. Based on this occurrence, the ML algorithm 805 can intelligently determine that those pixels likely constitute a beam of IR laser light.

After the ML algorithm 805 detects the IR laser light in the scene, the embodiments then perform a number of operations to display information corresponding to that detected IR laser light. For instance, returning to FIG. 4, method 400 includes an act (act 415) where the HMD visually displays a notification comprising information corresponding to the detected IR laser light.

To provide this notification, it is often beneficial to generate an overlaid image where the detected IR laser light, or at least a notification describing the detected IR laser light, is overlaid onto another image, to form a passthrough or overlaid image. FIGS. 9-13 are illustrative.

Figure 9:
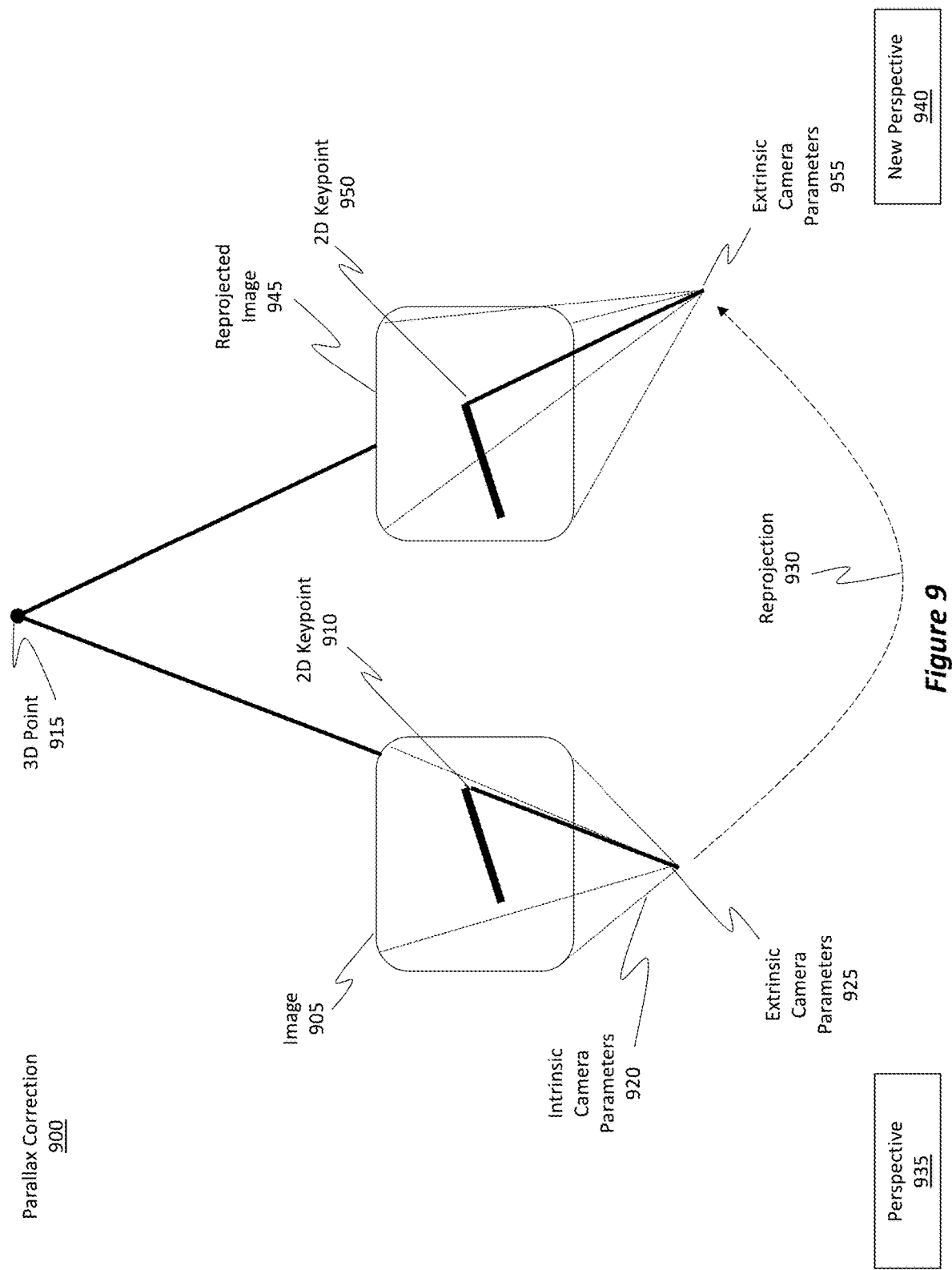
FIG. 9 illustrates a parallax correction operation that may be performed on the image portions comprising the detected IR laser light.

As an initial matter and as discussed earlier, the computer vision camera has a different perspective from the perspective of the user's pupil. In order to provide the user with an accurate portrayal of the positioning of the detected IR laser light, the embodiments are able to perform a parallax correction 900 operation, as shown in FIG. 9.

Figure 10:
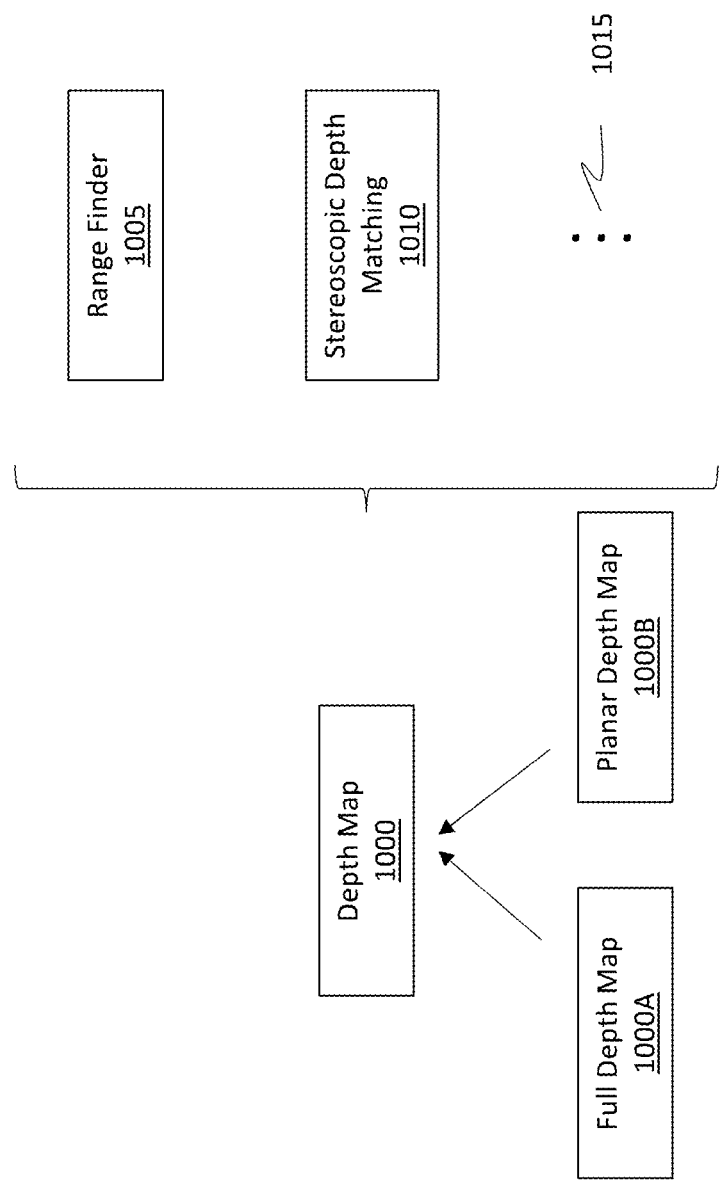
FIG. 10 demonstrates how the parallax correction relies on a depth map.

In order to perform the parallax correction 900, the embodiments first generate a depth map of the environment. Turning briefly to FIG. 10, this figure illustrates how a depth map 1000 may be generated or accessed by the embodiments.

In some cases, the depth map 1000 may be computed using a range finder 1005. In some cases, the depth map 1000 may be computed by performing stereoscopic depth matching 1010. The ellipsis 1015 shows how the depth map 1000 may be computed using other techniques and is not limited to the two illustrated in FIG. 10.

In some implementations, the depth map 1000 may be a full depth map 1000A in which a corresponding depth value is assigned for every pixel in the depth map. In some implementations, the depth map 1000 may be a single pixel depth map. In some implementations, the depth map 1000 may be a planar depth map 1000B where every pixel in the depth map is assigned the same depth value. In any event, the depth map 1000 of FIG. 10 represents one or more depths of objects located in the environment. The embodiments are able to perform the parallax correction 900 of FIG. 9 using the depth map 1000 of FIG. 10.

FIG. 9 details how the parallax correction 900 is performed in order to translate or transform a perspective of the detected IR laser light to align, match, or coincide with another perspective (e.g., perhaps the perspective of the thermal image 720 from FIG. 7 or perhaps the perspective of the user's pupil). Recall, some embodiments filter the computer vision image so that only pixels corresponding to the detected IR laser light remain. The parallax correction 900 may be performed on these remaining pixels.

By making or performing the above alignment, the embodiments can then selectively overlay portions (or all) of the detected IR laser light onto another image (e.g., perhaps the thermal image 720 from FIG. 7) while ensuring accurate alignment between the IR laser light and the other image's content. As will be described in more detail later, some embodiments reproject the IR laser light to align with the perspective of the user's pupils and also reproject the thermal image to align with the perspective of the user's pupils. Once these two reprojections are performed, then an overlaid image is generated by overlaying the reprojected IR laser light pixels onto the reprojected thermal image. Some embodiments, on the other hand, reproject the IR laser light pixels to align with the perspective of the thermal image and then generate the overlaid image. Once the overlaid image is generated, then this overlaid image is reprojected to align with the perspective of the user's pupils. Accordingly, various different reprojections may be performed in order to align an overlaid image's perspective with that of the user's pupils.

FIG. 9 shows an image 905, which is representative of the image comprising the detected IR laser light 810 shown in FIG. 8. The image 905 includes a 2D keypoint 910 and a corresponding 3D point 915 for that 2D keypoint 910. After determining the intrinsic camera parameters 920 (e.g., the camera's focal length, the principle point, and the lens distortion) and the extrinsic camera parameters 925 (e.g., the position and orientation of the camera), the embodiments are able to perform a reprojection 930 operation on the image 905 to reproject a perspective 935 embodied by that image 905 to a new perspective 940. In some cases, the new perspective 940 is that of the user's pupil while in other cases perhaps the new perspective 940 is that of a different image (e.g., perhaps the thermal image 720).

As a result of performing the reprojection 930 operation, the reprojected image 945 is generated, where the reprojected image 945 includes a 2D keypoint 950 corresponding to the 2D keypoint 910. In effect, the reprojection 930 operation produces a synthetic camera having new extrinsic camera parameters 955 so as to give the illusion that the reprojected image 945 was captured by the synthetic camera at the new perspective 940. In this regard, reprojecting the image 905 (which potentially includes pixels corresponding to only the detected IR laser light because other pixels were filtered out) compensates for a distance separating the computer vision camera from the user's pupils (or perhaps the thermal imaging camera) and also compensates for pose or perspective differences between the camera and the user's pupils (or perhaps the thermal imaging camera).

Accordingly, in some cases, the embodiments reproject the detected IR laser light to transform those pixels so those pixels' perspectives align with the perspective of the user's pupils. In some cases, the embodiments reproject the detected IR laser light to transform those pixels so those pixels' perspectives align with the perspective of another image, such as the thermal image 720 from FIG. 7. In that latter case, once the two perspectives are aligned, then the detected IR laser light can be directly overlaid onto the thermal image 720. Once that overlay is performed, then another parallax correction operation can be performed to align the perspective of the newly generated overlaid image with the perspective of the user's pupils.

In the former case, the pixels corresponding to the detected IR laser light are reprojected to first align with the user's pupils. Additionally, the thermal image 720 from FIG. 7 is also reprojected so as to cause its perspective to align with the user's pupils. Now that both images are aligned with the user's pupils, the pixels of the detected IR laser light can be directly overlaid onto the thermal image to form the overlaid image. Accordingly, the embodiments are able to employ multiple techniques for generating an overlaid image.

By way of summary, some embodiments first reproject the pixels of the detected IR light to match the perspective of the thermal image, then these embodiments generate the overlaid image, then these embodiments reproject the overlaid image so its perspective matches the perspective of the user's pupils. Alternatively, some embodiments reproject the pixels of the detected IR light to match the perspective of the user's pupils, at the same time these embodiments reproject the thermal image to align its perspective with the user's pupils, then (once the two images are aligned with the user's pupils) these embodiments overlay the detected IR laser light onto the thermal image to generate the overlaid image.

Figure 11:
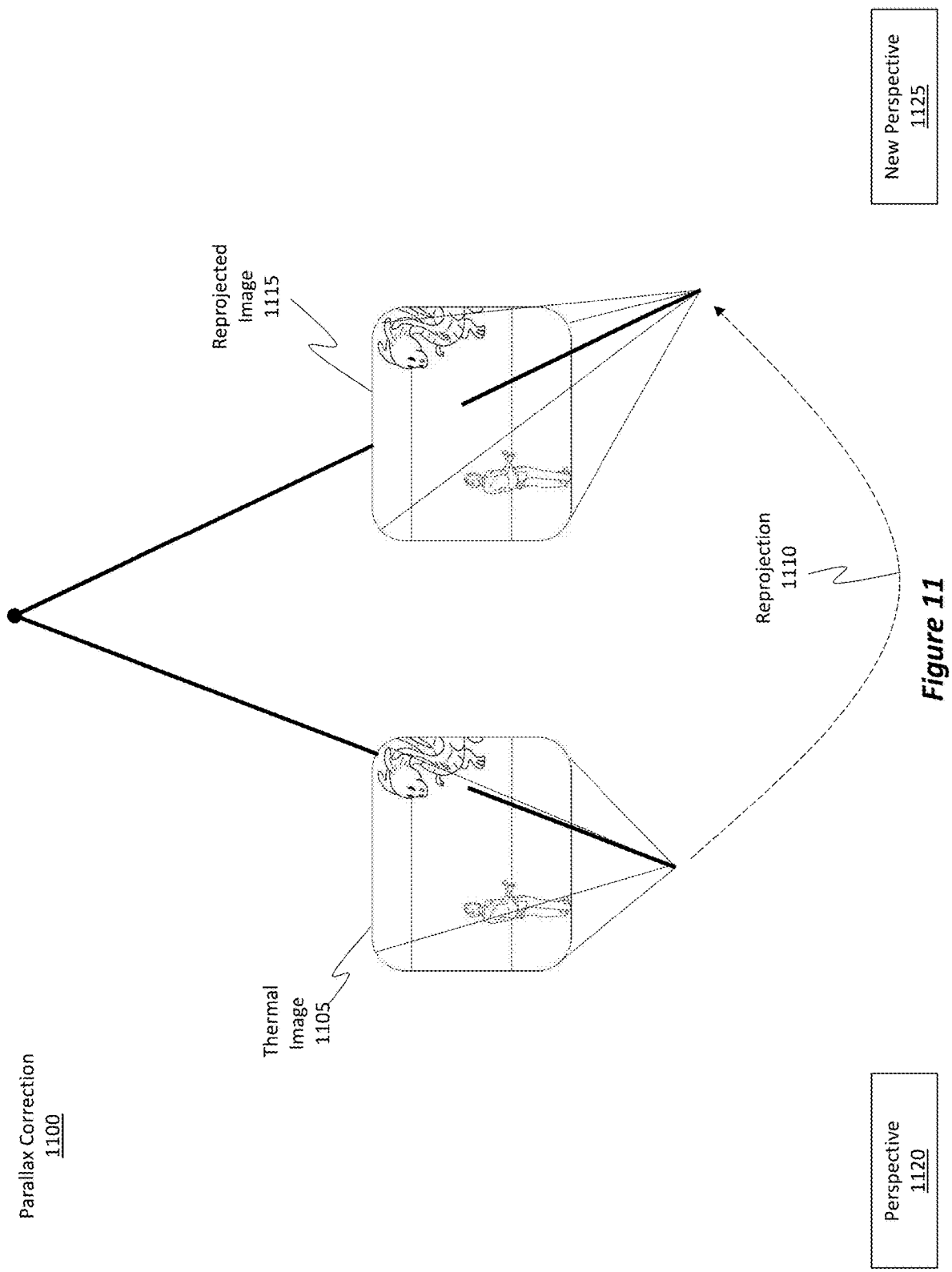
FIG. 11 illustrates how parallax correction may also be performed on the thermal image.

FIG. 11 illustrates another parallax correction 1100 operation that is similar to the parallax correction 900 of FIG. 9, but this parallax correction 1100 is being performed on the thermal image 1105. Briefly, the thermal image 1105, which is representative of the thermal image 720 from FIG. 7, is subject to a reprojection 1110 operation to generate a reprojected image 1115, where the perspective 1120 of the thermal image 1105 is modified into a new perspective 1125 corresponding to the user's pupil or perhaps some other novel perspective.

Accordingly, some embodiments cause the HMD to perform parallax correction to compensate for a positional offset between a pupil of an eye of a user wearing the HMD and any of the cameras mentioned herein, such as the computer vision camera and/or the thermal imaging camera. In some cases, performing the parallax correction is performed using a full depth map to perform a full reprojection. In some cases, performing the parallax correction is performed using a planar depth map to perform a planar reprojection.

Figure 12:
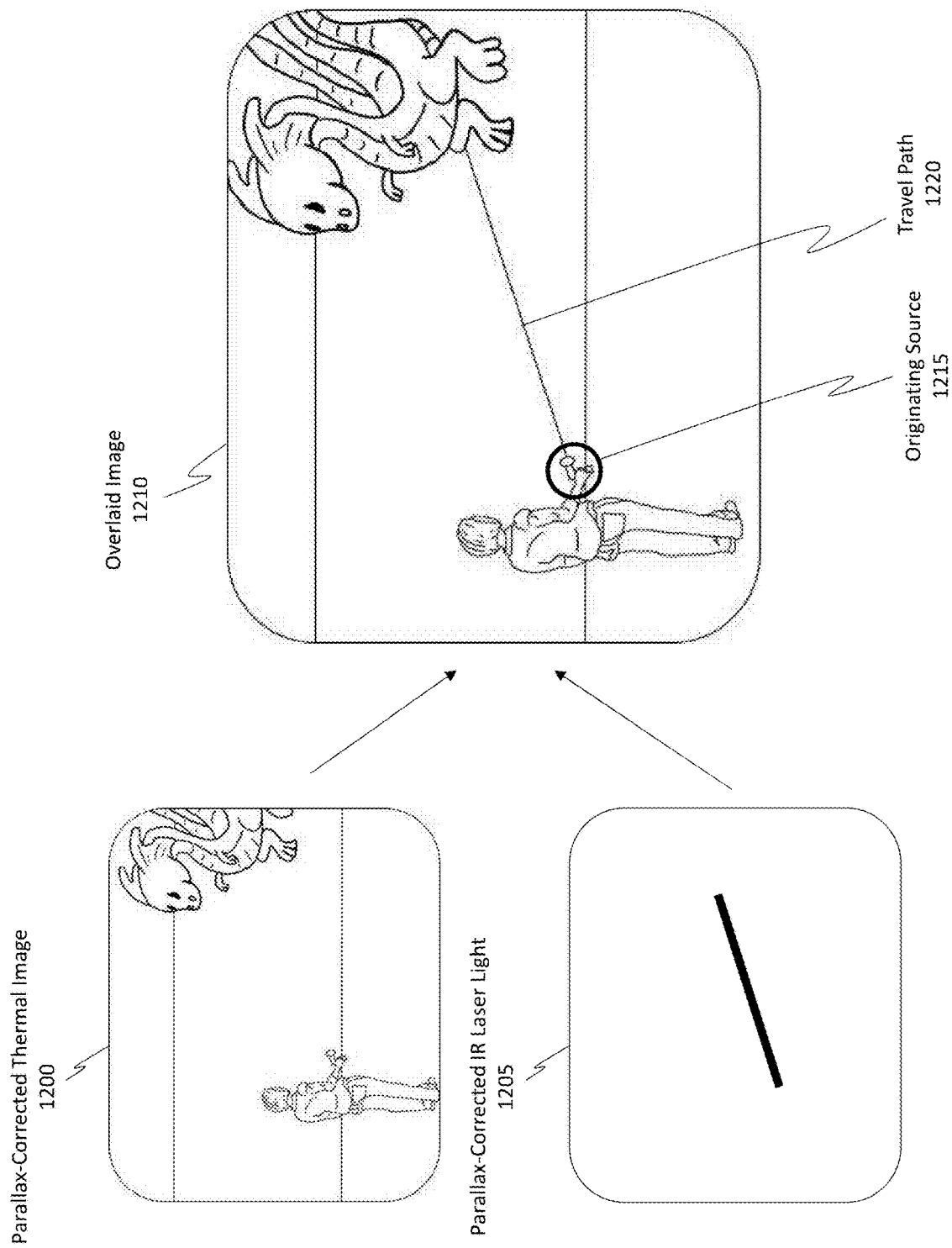
FIG. 12 illustrates how the pixels corresponding to the reprojected IR laser light can be overlaid onto the reprojected thermal image to form an overlaid image.

FIG. 12 shows a parallax-corrected thermal image 1200 and a parallax-corrected IR laser light 1205 image. In this example scenario, the embodiments overlay at least a portion of the parallax-corrected IR laser light 1205 image onto the parallax-corrected thermal image 1200 to generate the overlaid image 1210. This example scenario corresponds to the implementation where both the thermal image and the detected IR laser light are reprojected to match the perspective of the user's pupil. Of course, the other technique may also be used, where the detected IR laser light is first reprojected onto the thermal image (such that the detected IR laser light first matches the perspective of the thermal image) and then the resulting overlaid image is reprojected to match the perspective of the user's pupil. Throughout these reprojection operations, the embodiments rely on the depth maps that were discussed in FIG. 10.

FIG. 12 also shows how additional indicators or notifications may be provided on the overlaid image 1210, as was discussed in method act 415 of FIG. 4. That is, in some cases, the embodiments may provide a notification indicating an originating source 1215 (e.g., the laser emitter being held by the person) of the IR laser light. In some cases, the embodiments may provide a notification indicating a travel path 1220 of the IR laser light. In some cases, the IR laser light may be emphasized in the overlaid image 1210, such as through the use of different shading, colors, highlighting, format (e.g., dotted line), and so forth.

Figure 13:
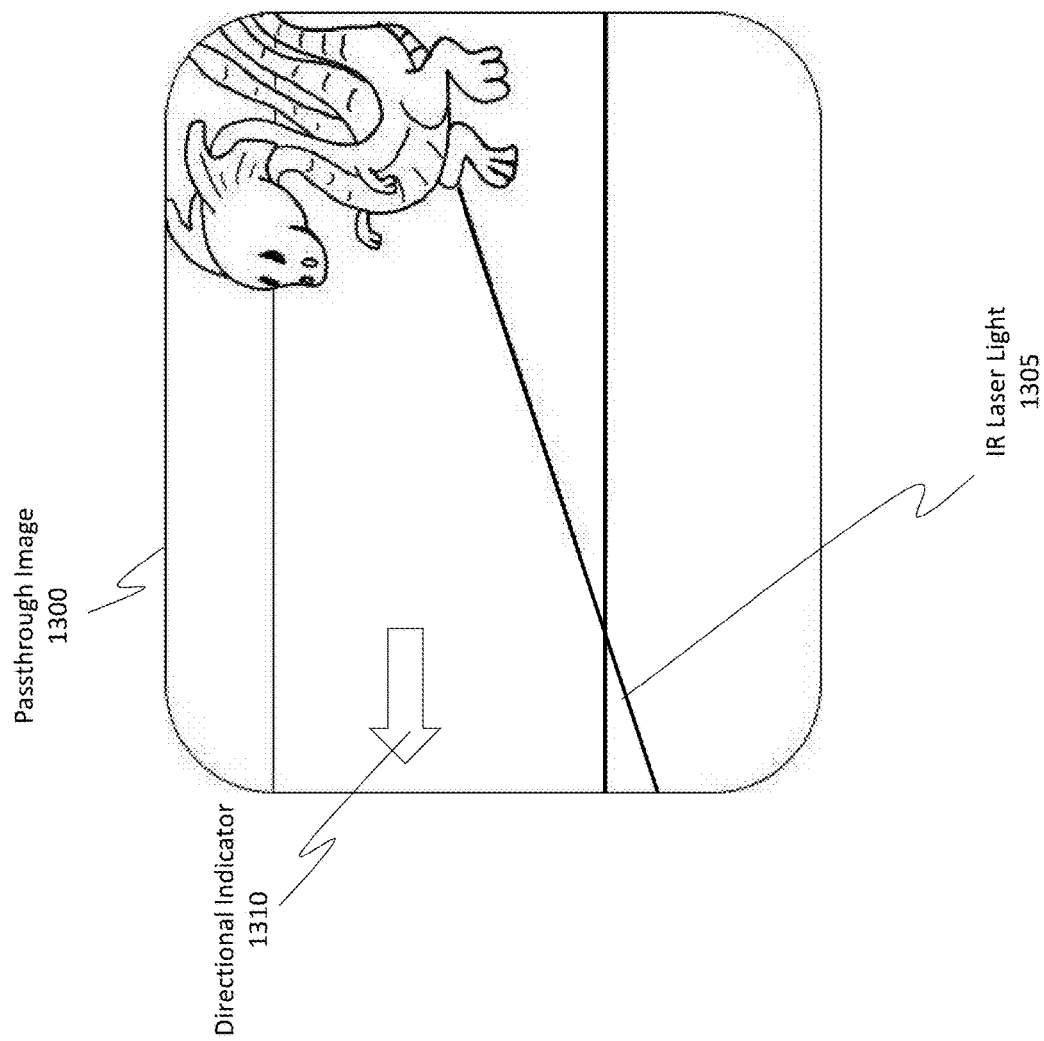
FIG. 13 illustrates an example passthrough image that includes different notifications with regard to the detected IR laser light.

Some embodiments provide a notification in the form of a directional indicator to indicate where the source of the IR laser light is likely to be, as shown in FIG. 13. Specifically, FIG. 13 shows a passthrough image 1300, which is representative of the overlaid image 1210 of FIG. 12. The passthrough image 1300 is visually illustrating the IR laser light 1305. In this example scenario, however, the source of the IR laser light 1305 is not included in the passthrough image 1300. The embodiments are able to provide a notification in the form of a directional indicator 1310 to illustrate where or in what direction the source of the IR laser light 1305 is likely located at.

Accordingly, the "notification" described in method act 415 of FIG. 4 may be implemented in various different ways. One way of implementing the notification involves displaying a traced travel path of the IR laser light. Another way of implementing the notification involves identifying an originating source of the IR laser light. Yet another way of implementing the notification involves providing a directional indicator indicating a direction from where the IR laser light originated. As described throughout this disclosure, the notification can be overlaid onto an image generated by a thermal imaging camera, as shown by FIG. 12 where the overlaid image 1210 is formed at least in part by a thermal image. Because the overlaid image 1210 can be considered as a passthrough image, it is also appropriate to say that the notification is overlaid onto a video passthrough image that has undergone parallax correction.

Additional Method(s)

Figure 14:
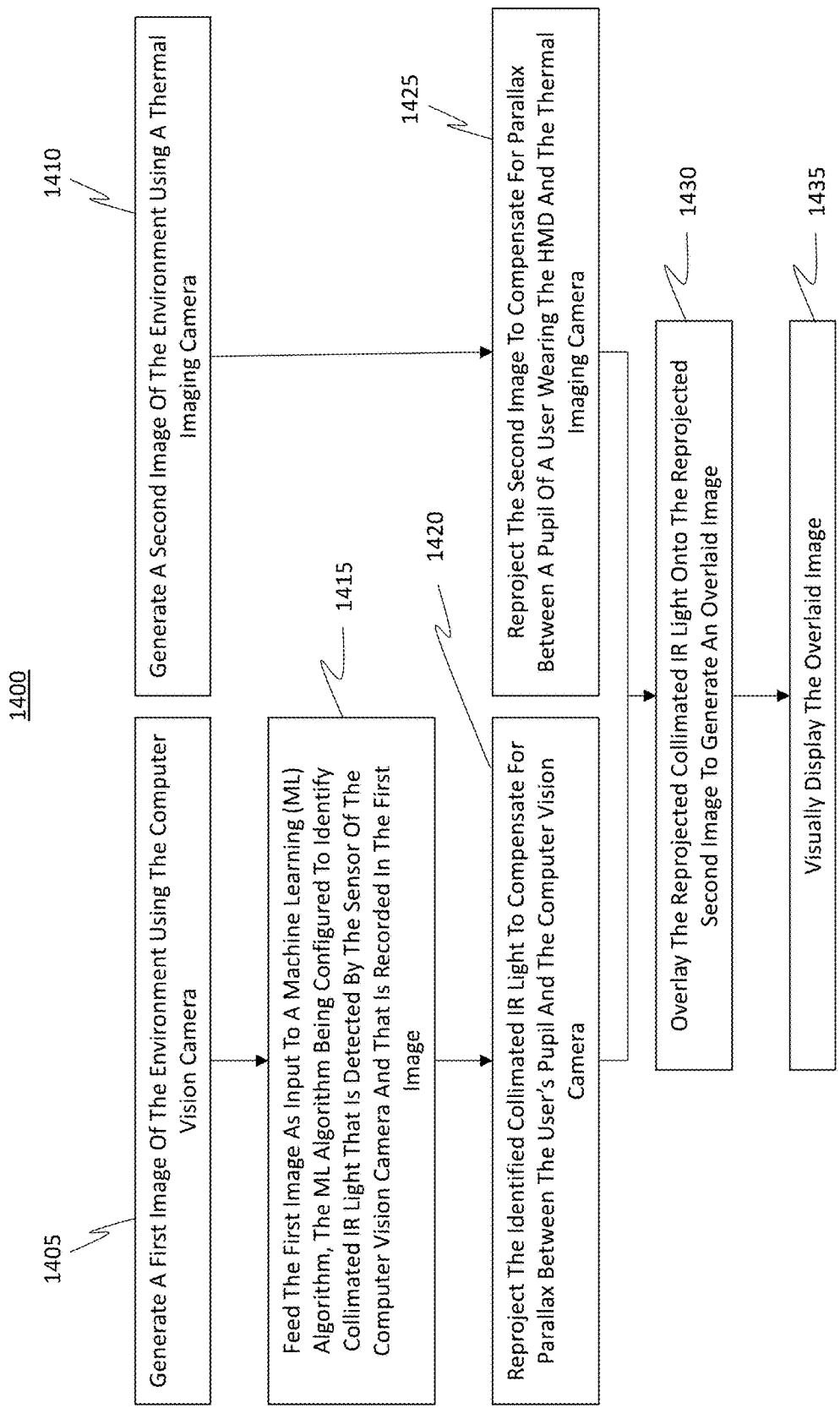
FIG. 14 illustrates another flowchart of an example method for detecting collimated IR light.

Attention will now be directed to FIG. 14, which illustrates a flowchart of an example method 1400 for detecting collimated IR light (e.g., laser light) that is being emitted in an environment. The method 1400 may be implemented by any of the HMDs discussed thus far. For instance, the HMD includes at least one computer vision camera that omits an IR light filter such that a sensor of the computer vision camera is operable to detect IR light, including collimated IR light, in the environment. The HMD also includes a thermal imaging camera.

Initially, method 1400 includes an act (act 1405) of generating a first image of the environment using the computer vision camera. The computer vision image 700 of FIG. 7 is representative of the image discussed in act 1405. Either before, during, or after act 1405, method 1400 includes an act (act 1410) of generating a second image of the environment using a thermal imaging camera. The thermal image 720 is representative of the thermal image in act 1410.

In act 1415, the first image is fed as input to a machine learning (ML) algorithm, such as the ML algorithm 805 of FIG. 8. This ML algorithm is configured to identify collimated IR light that is detected by the sensor of the computer vision camera and that is recorded in the first image. For instance, in FIG. 8, the ML algorithm 805 detects the IR laser light, as shown by detected IR laser light 810. In some cases, the ML algorithm distinguishes the collimated IR light or the IR laser light from other IR light by detecting a line or beam of IR light forming the collimated IR light/IR laser light. In some cases, the ML algorithm distinguishes the IR laser light or the collimated IR light from other IR light by detecting a difference in intensity between an intensity of the IR laser light/collimated IR light and intensities of the other IR light.

Act 1420 involves reprojecting the identified collimated IR light to compensate for parallax between the user's pupil (i.e. the user wearing the HMD) and the computer vision camera. Similarly, act 1425, which may be performed before, during, or after act 1420, involves reprojecting the second image to compensate for parallax between the user's pupil and the thermal imaging camera. In some implementations, the process of reprojecting the identified collimated IR light is performed by reprojecting only the identified collimated IR light included in the first image and refraining from reprojecting other content included in the first image. For instance, pixel content not corresponding to the collimated IR light can be filtered from the first image, leaving only the collimated IR light pixels in the first image. These remaining pixels (which correspond to the collimated IR light) can then be reprojected in the manner described above.

Because the content from the two different images are now aligned as a result of performing the parallax corrections, the embodiments can then directly overlay the collimated IR light pixels onto the thermal image. In this regard, act 1430 involves overlaying the reprojected collimated IR light onto the reprojected second image to generate an overlaid image. The overlaid image 1210 of FIG. 12 is illustrative of this operation. Finally, method 1400 includes an act (act 1435) of visually displaying the overlaid image.

In some embodiments, the HMDs implementing the disclosed methods are configured to omit all low light cameras. In some embodiments, the HMDs may include low light cameras, but the HMDs may cause those low light cameras to be in a powered off state so as to preserve battery power. It is often beneficial to configure the HMDs to include at least one thermal imaging camera so that the detected IR light can be overlaid onto the image generated by that thermal imaging camera, especially when the HMD is used in low light environments (e.g., below about 5 lux).

Example Computer/Computer Systems

Figure 15:
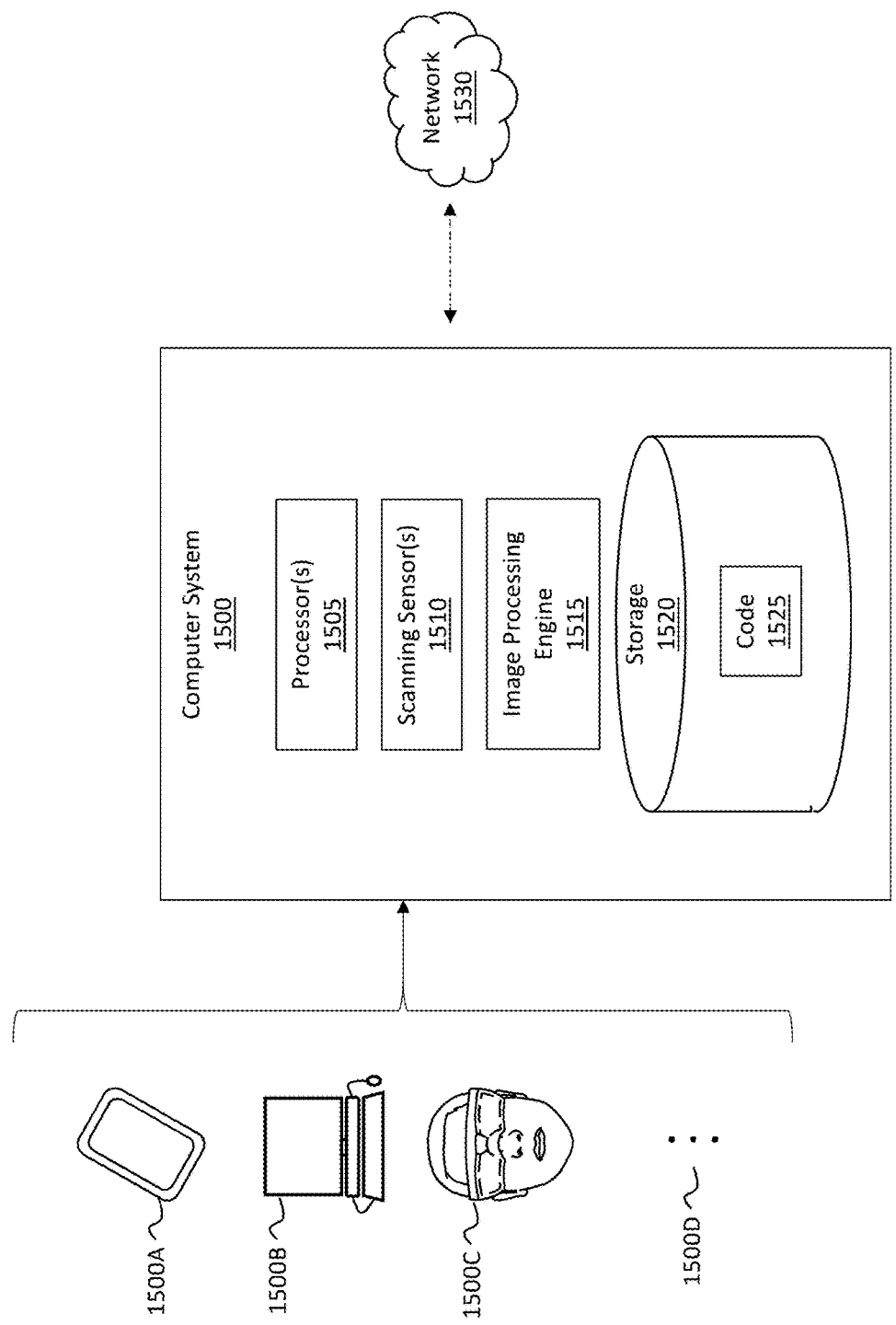
FIG. 15 illustrates an example computer system capable of performing any of the disclosed operations.

Attention will now be directed to FIG. 15 which illustrates an example computer system 1500 that may include and/or be used to perform any of the operations described herein. Computer system 1500 may take various different forms. For example, computer system 1500 may be embodied as a tablet 1500A, a desktop or laptop 1500B, a wearable device 1500C (e.g., such as any of the disclosed HMDs), a mobile device, a standalone device, or any other embodiment as shown by the ellipsis 1500D. Computer system 1500 may also be a distributed system that includes one or more connected computing components/devices that are in communication with computer system 1500.

In its most basic configuration, computer system 1500 includes various different components. FIG. 15 shows that computer system 1500 includes one or more processor(s) 1505 (aka a "hardware processing unit"), scanning sensor(s) 1510 (e.g., such as the scanning sensor(s) 205 of FIG. 2), an image processing engine 1515, and storage 1520.

Regarding the processor(s) 1505, it will be appreciated that the functionality described herein can be performed, at least in part, by one or more hardware logic components (e.g., the processor(s) 1505). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Any type of depth detection may be utilized by the computer system 1500 and by the scanning sensor(s) 1510. Examples include, but are not limited to, stereoscopic depth detection (both active illumination (e.g., using a dot illuminator), structured light illumination (e.g., 1 actual camera, 1 virtual camera, and 1 dot illuminator), and passive (i.e. no illumination)), time of flight depth detection (with a baseline between the laser and the camera, where the field of view of the camera does not perfectly overlap the field of illumination of the laser), range finder depth detection, or any other type of range or depth detection.

The image processing engine 1515 may be configured to perform any of the method acts discussed in connection with method 400 of Figure and method 1400 of FIG. 14. In some instances, the image processing engine 1515 includes a ML algorithm. That is, ML may also be utilized by the disclosed embodiments, as discussed earlier. ML may be implemented as a specific processing unit (e.g., a dedicated processing unit as described earlier) configured to perform one or more specialized operations for the computer system 1500. As used herein, the terms "executable module," "executable component," "component," "module," "model," or "engine" can refer to hardware processing units or to software objects, routines, or methods that may be executed on computer system 1500. The different components, modules, engines, models, and services described herein may be implemented as objects or processors that execute on computer system 1500 (e.g. as separate threads). ML models and/or the processor(s) 1505 can be configured to perform one or more of the disclosed method acts or other functionalities.

Storage 1520 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well.

Storage 1520 is shown as including executable instructions (i.e. code 1525). The executable instructions represent instructions that are executable by the processor(s) 1505 (or perhaps even the image processing engine 1515) of computer system 1500 to perform the disclosed operations, such as those described in the various methods.

The disclosed embodiments may comprise or utilize a special-purpose or general-purpose computer including computer hardware, such as, for example, one or more processors (such as processor(s) 1505) and system memory (such as storage 1520), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that "store" computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1500 may also be connected (via a wired or wireless connection) to external sensors (e.g., one or more remote cameras) or devices via a network 1530. For example, computer system 1500 can communicate with any number devices or cloud services to obtain or process data. In some cases, network 1530 may itself be a cloud network. Furthermore, computer system 1500 may also be connected through one or more wired or wireless networks 1530 to remote/separate computer systems(s) that are configured to perform any of the processing described with regard to computer system 1500.

A "network," like network 1530, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1530. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head-mounted device (HMD) configured to detect infrared (IR) laser light being emitted in an environment, said HMD comprising:
at least one computer vision camera that omits an IR light filter such that a sensor of the at least one computer vision camera is operable to detect IR light, including IR laser light, in the environment;
one or more processors; and
one or more computer-readable hardware storage devices that store instructions that are executable by the one or more processors to cause the HMD to at least:
generate an image of the environment using the at least one computer vision camera;
feed the image as input to a machine learning (ML) algorithm, said ML algorithm being configured to identify IR laser light that is detected by the sensor of the at least one computer vision camera and that is recorded in the image, wherein the ML algorithm is configured to distinguish the IR laser light, which is represented by a first set of pixels spanning a length in the image, from other IR light, which is represented by a second set of pixels in the image, by detecting a line of IR light forming the IR laser light, the line of IR light being visible in the image via the first set of pixels, and wherein the ML algorithm traces the first set of pixels in the image to detect the line of IR light as the line of IR light spans the length within the image; and
visually display a notification comprising information corresponding to the detected IR laser light.

2. The HMD of claim 1, wherein generating the image of the environment is triggered in response to a determination that an ambient light level of the environment is at or below about 5 lux.

3. The HMD of claim 1, wherein execution of the instructions further causes the HMD to perform parallax correction to compensate for a positional offset between a pupil of an eye of a user wearing the HMD and the at least one computer vision camera.

4. The HMD of claim 3, wherein performing the parallax correction is performed using a full depth map to perform a full reprojection.

5. The HMD of claim 3, wherein performing the parallax correction is performed using a planar depth map to perform a planar reprojection.

6. The HMD of claim 1, wherein execution of the instructions further causes the HMD to:
in response to the ML algorithm identifying the IR laser light in the image, tracing the IR laser light detected in the image to identify a travel path of the IR laser light through the environment.

7. The HMD of claim 6, wherein the notification includes a display of the traced travel path of the IR laser light.

8. The HMD of claim 6, wherein the notification includes an identification of an originating source of the IR laser light.

9. The HMD of claim 6, wherein the notification includes a directional indicator indicating a direction from where the IR laser light originated.

10. The HMD of claim 1, wherein the IR light filter is a detachable filter such that the IR light filter is detachable from the at least one computer vision camera.

11. The HMD of claim 1, wherein:
the IR laser light is generated by a device that is moving throughout the environment such that the IR laser light is also moving throughout the environment,
the image is one of a plurality of images that capture the IR laser light, and
the ML algorithm traces the line of IR light despite the line of IR light moving throughout the environment.

12. A method for detecting infrared (IR) laser light being emitted in an environment, said method being performed by a head-mounted device (HMD) configured to include at least one computer vision camera that omits an IR light filter such that a sensor of the at least one computer vision camera is operable to detect IR light, including IR laser light, in the environment, said method comprising:
generating an image of the environment using the at least one computer vision camera;
feeding the image as input to a machine learning (ML) algorithm, said ML algorithm being configured to identify IR laser light that is detected by the sensor of the at least one computer vision camera and that is recorded in the image, wherein the ML algorithm is configured to distinguish the IR laser light, which is represented by a first set of pixels spanning a length in the image, from other IR light, which is represented by a second set of pixels in the image, by detecting a line of IR light forming the IR laser light, the line of IR light being visible in the image via the first set of pixels, and wherein the ML algorithm traces the first set of pixels in the image to detect the line of IR light as the line of IR light spans the length within the image; and
visually displaying a notification comprising information corresponding to the detected IR laser light.

13. The method of claim 12, wherein the at least one computer vision camera is a head tracking camera.

14. The method of claim 12, wherein the notification is overlaid onto an image generated by a thermal imaging camera.

15. The method of claim 12, wherein the notification is overlaid on a video passthrough image that has undergone parallax correction.

16. The method of claim 12, wherein the HMD omits all low light cameras.

17. The method of claim 12, wherein the HMD further includes a thermal imaging camera.

18. The method of claim 12, wherein the ML algorithm is further configured to distinguish the IR laser light from the other IR light by detecting a difference in intensity between an intensity of the IR laser light and intensities of the other IR light.

19. A head-mounted device (HMD) configured to detect collimated infrared (IR) light being emitted in an environment, said HMD comprising:
at least one computer vision camera that omits an IR light filter such that a sensor of the at least one computer vision camera is operable to detect IR light, including collimated IR light, in the environment;
one or more processors; and
one or more computer-readable hardware storage devices that store instructions that are executable by the one or more processors to cause the HMD to at least:
generate a first image of the environment using the at least one computer vision camera;
generate a second image of the environment using a thermal imaging camera;
feed the first image as input to a machine learning (ML) algorithm, said ML algorithm being configured to identify collimated IR light that is detected by the sensor of the at least one computer vision camera and that is recorded in the first image, wherein the ML algorithm is configured to distinguish the collimated IR laser light, which is represented by a first set of pixels spanning a length in the first image, from other IR light, which is represented by a second set of pixels in the first image, by detecting a line of collimated IR light forming the collimated IR laser light, the line of collimated IR light being visible in the first image via the first set of pixels, and wherein the ML algorithm traces the first set of pixels in the image to detect the line of IR light as the line of IR light spans the length within the image;

reproject the second image to compensate for parallax between a pupil of a user wearing the HMD and the thermal imaging camera;

reproject the identified collimated IR light to compensate for parallax between the user's pupil and the at least one computer vision camera;

overlay the reprojected collimated IR light onto the reprojected second image to generate an overlaid image; and visually display the overlaid image.

20. The HMD of claim 19, wherein reprojecting the identified collimated IR light is performed by reprojecting only the identified collimated IR light included in the first image and refraining from reprojecting other content included in the first image.

* * * * *